(12) United States Patent
Nelson

(10) Patent No.: US 10,769,436 B2
(45) Date of Patent: Sep. 8, 2020

(54) MULTIBAND FILTERING IMAGE COLLECTION AND ANALYSIS

(71) Applicant: Sentera, Inc., Minneapolis, MN (US)

(72) Inventor: Ryan Lee Nelson, Apple Valley, MN (US)

(73) Assignee: Sentera, Inc., Minneapolis, MN (US)

( * ) Notice: Subject to any disclaimer, the term of this patent is extended or adjusted under 35 U.S.C. 154(b) by 121 days.

(21) Appl. No.: 15/957,815

(22) Filed: Apr. 19, 2018

(65) Prior Publication Data

US 2018/0307906 A1 Oct. 25, 2018

Related U.S. Application Data

(60) Provisional application No. 62/487,133, filed on Apr. 19, 2017.

(51) Int. Cl.
| | |
|---|---|
| *G06T 7/90* | (2017.01) |
| *H04N 9/83* | (2006.01) |
| *H04N 13/156* | (2018.01) |
| *G06K 9/00* | (2006.01) |
| *H04N 9/097* | (2006.01) |
| *H04N 5/33* | (2006.01) |
| *G06T 7/00* | (2017.01) |

(52) U.S. Cl.
CPC ........ *G06K 9/00657* (2013.01); *G06T 7/0012* (2013.01); *G06T 7/90* (2017.01); *H04N 5/332* (2013.01); *H04N 9/097* (2013.01); *G06T 2207/10036* (2013.01); *G06T 2207/30188* (2013.01)

(58) Field of Classification Search
CPC ......... G02B 23/18; A01G 7/00; G01J 3/0205; G06T 7/90; H04N 9/083; H04N 13/156

USPC .......................................................... 348/144
See application file for complete search history.

(56) References Cited

U.S. PATENT DOCUMENTS

| | | | |
|---|---|---|---|
| 2012/0155714 A1 | 6/2012 | Douglas et al. | |
| 2016/0006954 A1 | 1/2016 | Robertson | |
| 2016/0283791 A1* | 9/2016 | Ogura | ...................... A01G 7/00 |
| 2018/0010963 A1* | 1/2018 | Wolf | ...................... G01J 3/0205 |
| 2018/0176488 A1* | 6/2018 | Dvir | ...................... G02B 23/18 |

FOREIGN PATENT DOCUMENTS

WO WO-2014156039 A1 10/2014

OTHER PUBLICATIONS

"Parrot Sequoia+ Capture the Invisible, Monitor Your Crops", https://www.parrot.com/business-solutions-us/parrot-professional/parrot-sequoia#parrot-sequoia-, (Accessed on Jul. 5, 2018), 12 pgs.

* cited by examiner

*Primary Examiner* — Albert Kir
(74) *Attorney, Agent, or Firm* — Hamre, Schumann, Mueller & Larson, P.C.

(57) ABSTRACT

An image capture device may capture visible and infrared light, and image analysis may be used to generate a map of the Normalized Difference Vegetation Index (NDVI) of healthy vegetation. Because NDVI data focuses on red and near infrared (NIR) reflectance of plants, NDVI data may be generated using an aircraft-mounted camera with optical filtering to collect various wavelengths. To reduce the size, weight, complexity, and cost of the image analysis system, a multiband optical filter may be used to capture multiple passbands simultaneously.

21 Claims, 7 Drawing Sheets

MULTIBAND FILTERING IMAGE COLLECTION AND ANALYSIS

PRIORITY APPLICATIONS

This application claims the benefit of priority of U.S. Provisional Application No. 62/487,133, filed Apr. 19, 2017, which is hereby incorporated by reference in its entirety.

TECHNICAL FIELD

Embodiments described herein generally relate to multi-band imagery collection and analysis.

BACKGROUND

Remote capture and analysis of images may be used to provide remote sensing of various features. One example of the use of remote sensing occurs within precision agriculture. In an example, an image capture device mounted on an aerial vehicle may capture visible light and near-infrared and image analysis may be used to generate a map of the Normalized Difference Vegetation Index (NDVI) of healthy vegetation. Conventional image capture devices may provide estimates of visible light that are sufficient for generating photographs, however these image capture devices are ineffective at providing accurate estimates of near-infrared light. What is needed is an improved image capture and analysis framework for research and analytics applications.

DESCRIPTION OF EMBODIMENTS

The present subject matter provides a technical solution for various technical problems associated with remote sensing of various features. The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
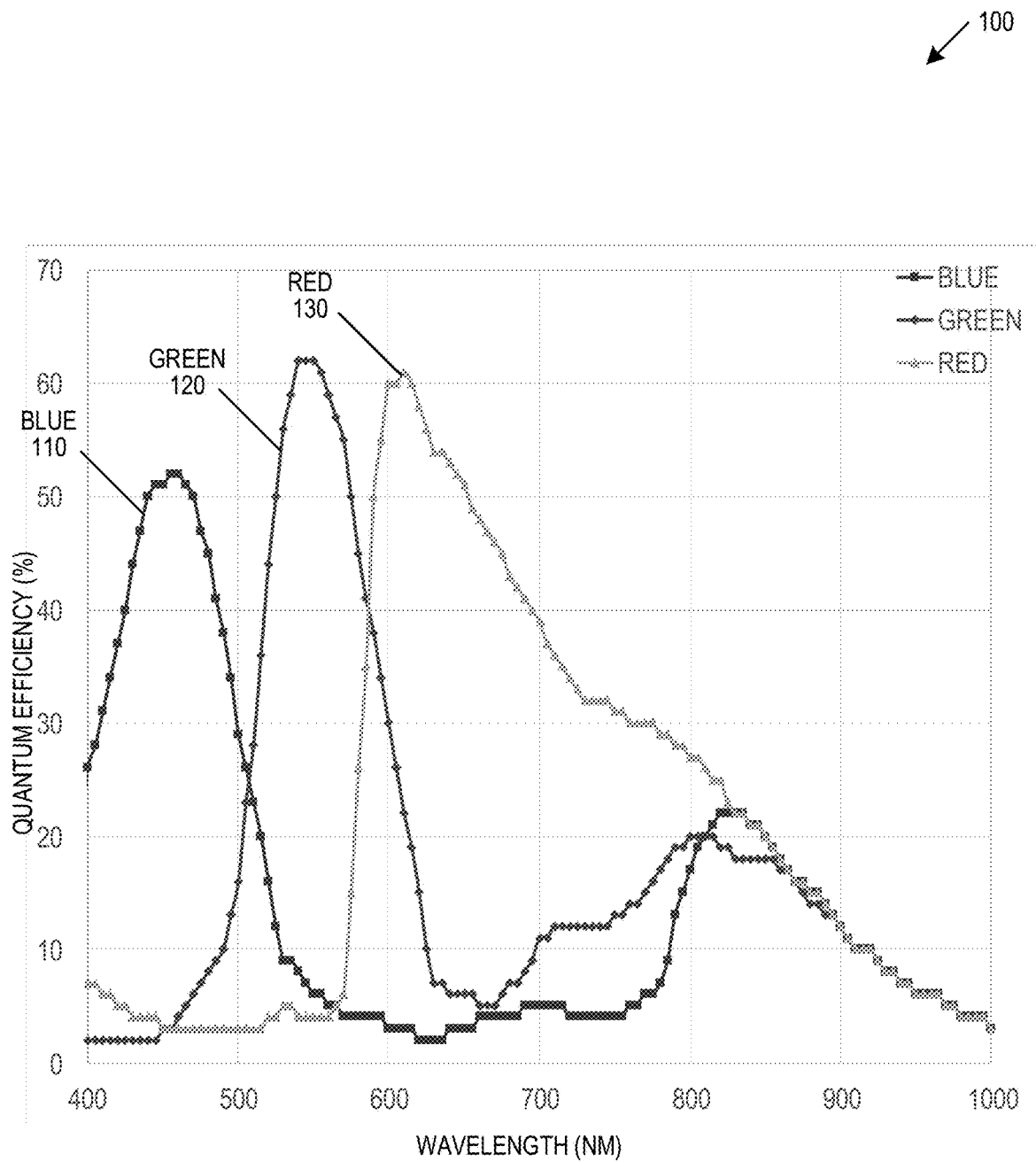
FIG. 1 is a graph of a first response curve, in accordance with at least one embodiment.

FIG. 1 is a graph of a first response curve 100, in accordance with at least one embodiment. Response curve 100 includes a typical quantum efficiency response (e.g., light sensitivity) of an image sensor (e.g., focal plane array (FPA)). Response curve 100 depicts the quantum efficiency from a 3-channel image sensor, where the quantum efficiency includes a blue channel 110, a green channel 120, and a red channel 130. As shown in FIG. 1, the three bands within response curve 100 have significant overlap. For example, the green channel 120 that is intended to sense the green spectral range also includes a substantial amount of light coming from sources outside of the green spectral range. While such sensors can be used to estimate blue, green, and red light for photographs, they provide limited ability to isolate specific bands of light for use in research or analytics applications. For example, such sensors do not provide the ability to identify and isolate light that is only within the green spectral range.

The first response curve 100 may be used to generate NDVI data to provide an indication of crop health. Because NDVI data focuses on red and near infrared (NIR) reflectance of plants. NDVI data may be generated using an aircraft-mounted camera with optical filtering to collect the red and NIR wavelengths. An NDVI data set may be generated using image data collected in the red and NIR wavelengths, such as using the formula:

$$NDVI = \frac{(NIR - \text{red})}{(NIR + \text{red})}$$

Similarly, a green NDVI (GNDVI) data set may be generated using image data collected in the green and NIR wavelengths, such as using the formula:

$$GNVDI = \frac{(NIR - \text{green})}{(NIR + \text{green})}$$

Image data in the red and NIR wavelengths may be gathered using image capture devices combined with single-band or multiband bandpass optical filters. In an example, a longpass optical filter may be applied to first response curve 100 to allow wavelengths above around 600 nm to pass. By reducing or eliminating light whose wavelength is below around 600 nm, the remaining light captured by the image sensor is heavily weighted in the NIR region. Because of this weighting, the blue channel may be used as an approximation of NIR. Similarly, red light may be estimated by subtracting blue channel response from the red channel response. Because the red and blue sensitivity is similar above approximately 800 nm, the remaining response on the red channel may be in the 600 nm to 800 nm range. However, the use of the 600 nm high-pass filter does not provide precise data. As shown in FIG. 1, a significant portion of what is being sensed by the red channel is in the 700-800 nm range, which is considered within the "red edge" or NIR spectral range, rather than within a 600-700 nm range generally associated with red wavelengths. Also, some of what is being sensed by the blue channel is actually leakage coming from the 600-700 nm range associated with red wavelengths. This precision may be improved using some of the systems and methods described below.

Figure 2:
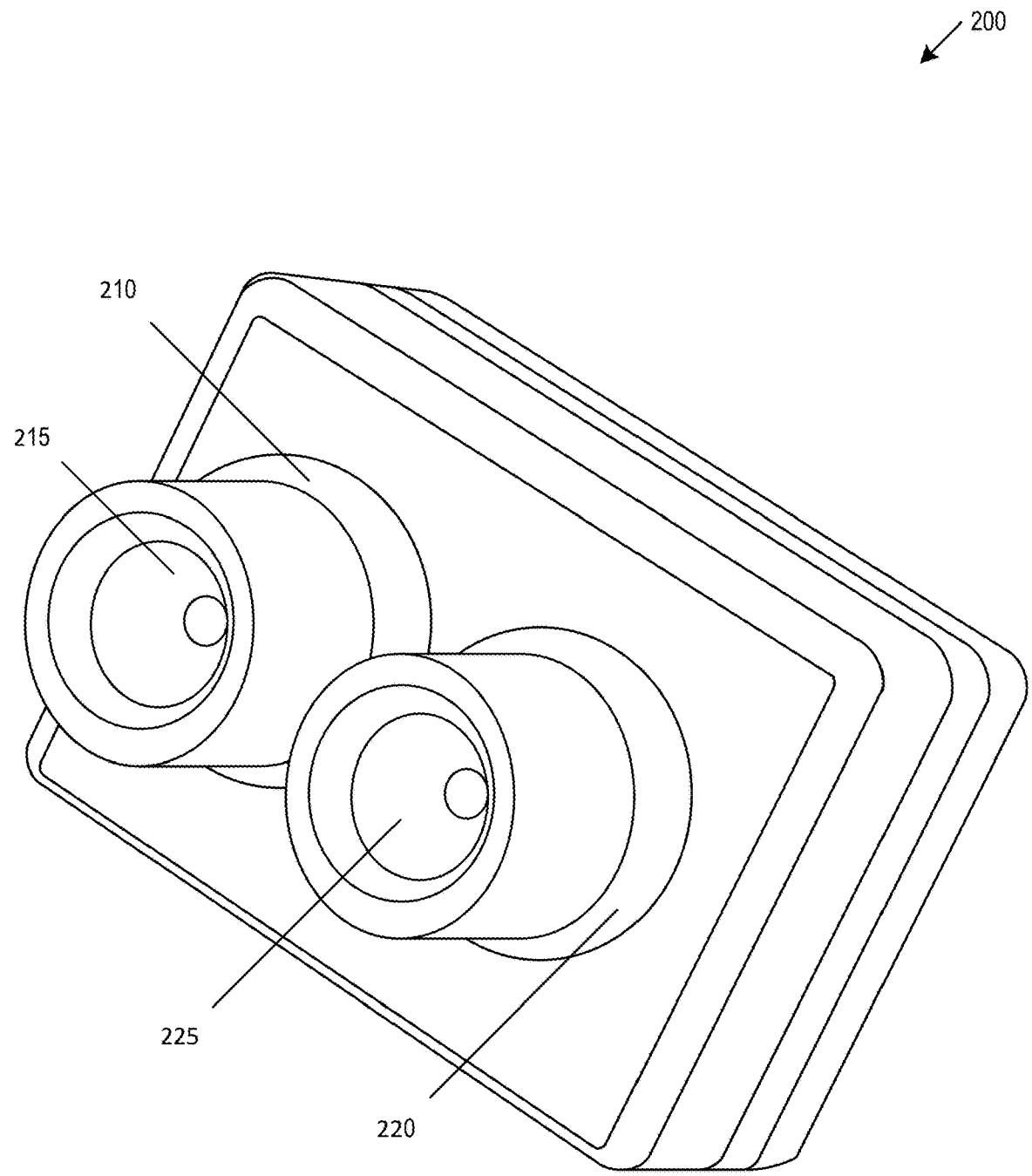
FIG. 2 is a perspective diagram of an image capture device, in accordance with at least one embodiment.

FIG. 2 is a perspective diagram of an image capture device 200, in accordance with at least one embodiment. Image capture device 200 may include a first image capture hardware module 210 and a second image capture hardware module 220. The first module 210 includes a lens with a first optical filter 215, and the second module 220 includes a lens with a second optical filter 225. Each of the first optical filter 215 and second optical filter 225 includes a bandpass optical filter that allows a specific band of light wavelengths (e.g., the passband) to pass through to a corresponding single-channel image sensor (not shown) within the image capture device 200, where the specific band is converted by the sensor into precise spectral data. For example, to collect precise data for the green channel, a monochrome sensor may be used with a narrow bandpass filter that only allows green light to pass. Each optical filter 215 and 225 may be multiple bandpass filters (e.g., multispectral filters) that pass one or more specific bands of light wavelengths and reject other light wavelengths. Similarly, the first image capture hardware module 210 and the second image capture hardware module 220 may include optical sensors that are most sensitive to one or more specific bands of light wavelengths. For example, a 3-channel Red-Green-Blue (RGB) sensor may be most sensitive to red light (e.g., 575 nm to 675 nm), to green light (e.g., 495 nm to 0.570 nm), and to blue light (e.g., 450 nm to 495 nm). In various embodiments, the optical sensors may be most sensitive to bands of light wavelengths that are in common with or different from the light wavelengths filtered by optical filter 215 and 225. For example, an RGB image sensor may be used with an RGB multispectral filter, or an RGB image sensor may be used with a filter that passes red edge and NIR light wavelengths.

Various optical filters and image sensors may be used to provide additional precise spectral data for each additional bandwidth region of interest. For agricultural applications, the primary regions of interest may include green, red, NIR wavelengths (e.g., 730 nm to 2500 nm), red edge wavelengths (e.g., 680 nm to 730 nm), or other regions of interest. In an example embodiment, image capture device 200 may include a first optical filter 215 that passes green light and a second optical filter 225 that passes NIR light, where the green and NIR spectral data is used to calculate green NDVI values. Additional bandpass filters and image sensors may be required to capture multiple spectral ranges of interest. For example, a five-sensor array may be used to capture blue, green, red, NIR, and red edge. However, additional sensors increase size, weight, complexity, and cost. Reduction of size and weight can be an especially important factor in remote sensing applications that use an airborne image capture system. In contrast with a system that uses a five-sensor array, image capture device 200 provides the ability to capture precise spectral data while further reducing size and weight by using two different multiple passband multiband) optical filters to capture five or more channels. Each of the two multiband optical filters includes multiple passbands and multiple stopbands, enabling the filters to pass multiple separated spectral regions, such as shown in FIG. 3.

Figure 3:
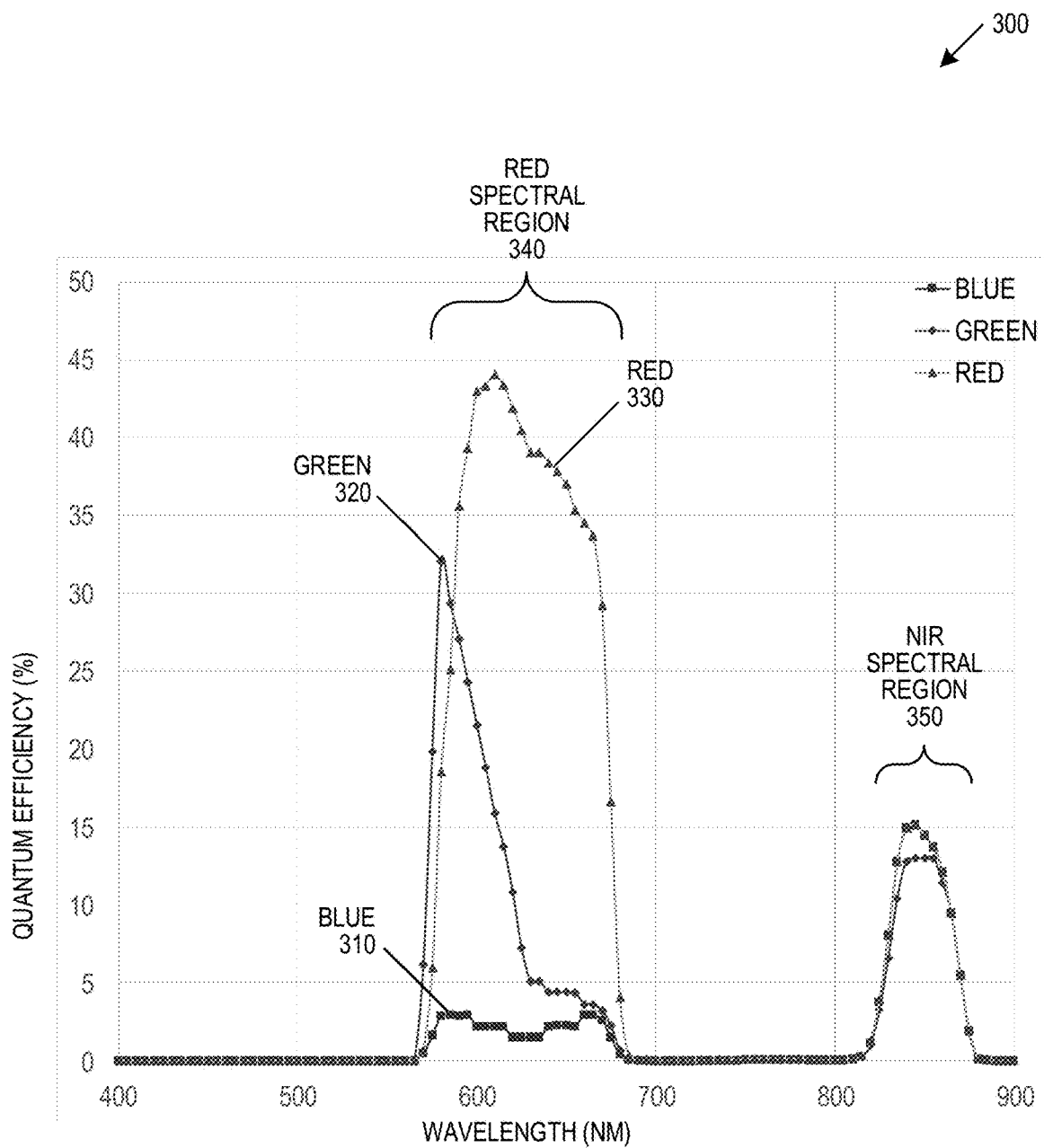
FIG. 3 is a graph of a second response curve, in accordance with at least one embodiment.

FIG. 3 is a graph of a second response curve 300, in accordance with at least one embodiment. Response curve 300 may be generated using the image capture device 200. For example, the first optical filter 215 may pass a band of light in a red spectral region 340 and a band of light in a NIR spectral region 350. Response curve 300 may be generated using a multiband filter that passes spectral regions in red 340 and NIR 350 wavelength ranges. By focusing on the red edge 340 and NIR 350 wavelength ranges, other wavelength sources and spectral leakage from outside the desired band can be reduced or eliminated. Pairing this multiple bandpass optical filter with the image sensor with sensitivity curve 100, the resulting sensitivity is reflected by blue channel 310, green channel 320, and red channel 330. Each of these channels may include sensitivity in the red region 340 and the NIR region 350. For example, though a blue image sensor may be most sensitive to light within blue wavelengths (e.g., 450 nm to 495 nm), the blue image sensor is also sensitive to light within the NIR region 350. The content in each region can be determined by comparing the responses from the various channels. For example, the blue channel 310 and the red channel 330 may be used to determine the spectral content in the red region 340 (e.g., true red content) and the spectral content in the NIR region 350. The blue channel 310 is most sensitive to the NIR range, but also includes a small portion of collected light outside of the desired NIR wavelength band, the NIR wavelength band spanning from approximately 825 nm to 875 nm. The small amount of the blue channel found inside of the red region may be subtracted out as a predetermined percentage of the red channel. For example, the content of the blue channel response contained in the NIR region 350 may be calculated as the difference between the blue channel 310 and 10% of red channel 330:

NIR Light=Blue Channel−(0.10×Red Light)

Similarly, the red channel 330 could be slightly corrected by adding a percentage, such as calculating the red channel 330 as 10% more than the difference between the red channel 330 and the blue channel 310:

Red Light=(Red Channel−Blue Channel)×1.10

This approach reduces or eliminates light received outside the two desired regions, which dramatically improves the accuracy of the resultant data and the NDVI calculations. The contributions outside of the desired spectral ranges have been reduced or eliminated such that they do not affect the measurements.

Figure 4:
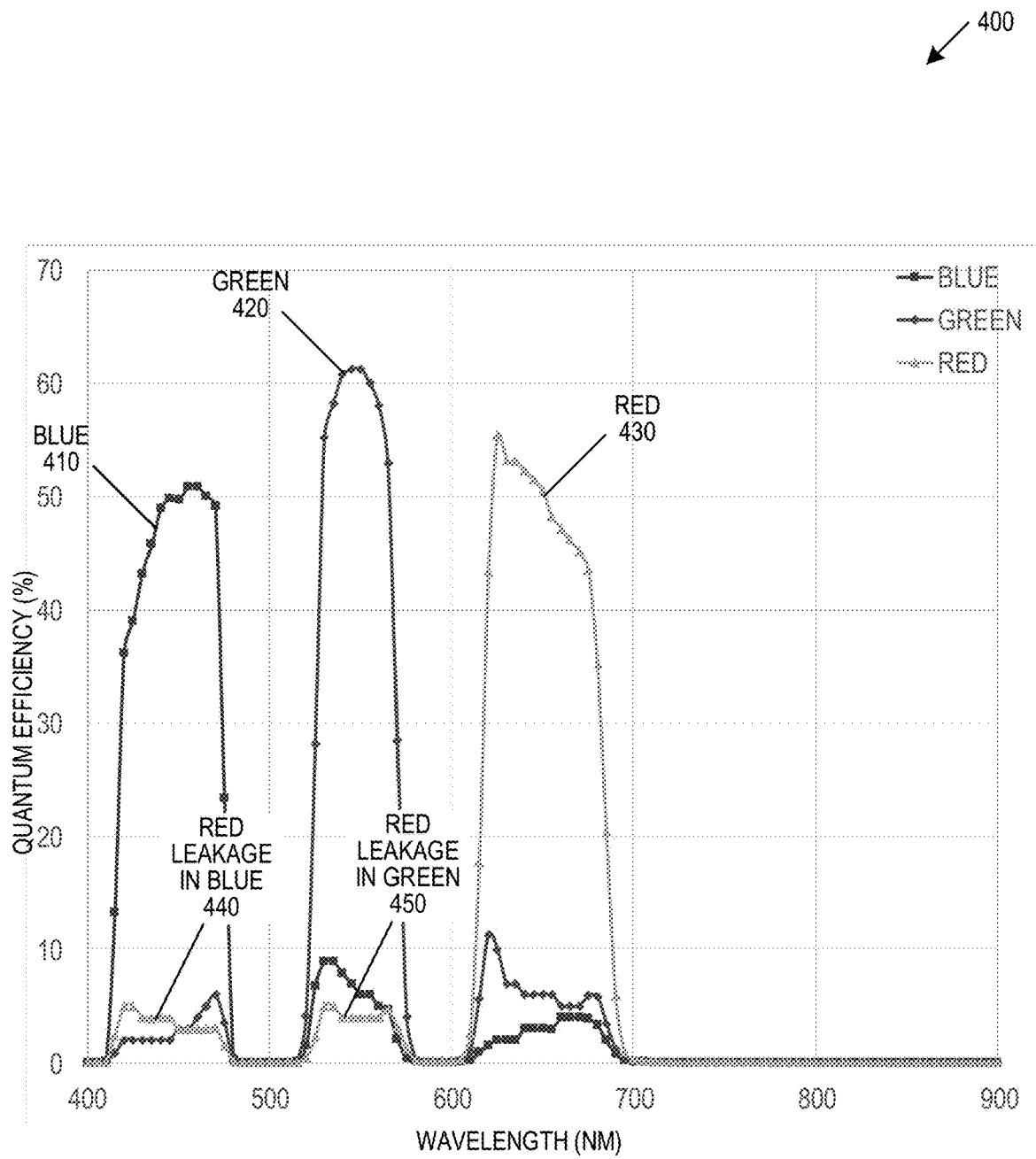
FIG. 4 is a graph of a third response curve, in accordance with at least one embodiment.

FIG. 4 is a graph of a third response curve 400, in accordance with at least one embodiment. Response curve 400 may be generated using the image capture device 200. For example, the first optical filter 215 may pass a narrow band of blue light in a blue channel 410, a narrow band of green light in a green channel 420, and a narrow band of red light in a red channel 430 to a corresponding three-channel image sensor within the image capture device 200. As shown in FIG. 4, each narrow spectral band includes a small portion of spectral leakage other spectral bands. For example, the blue channel 410 includes a first portion of red leakage 440 and the green channel 420 includes a second portion of red leakage 450. The magnitude of each spectral band may be calculated based on the peak of the band itself (e.g., area under the curve) and based on an estimate of the spectral leakage, where the spectral leakage estimates are based on the magnitude of the other two spectral bands. For example, an accurate estimate of the magnitude of the red light in the red spectral range may be calculated by subtracting the out-of-band leakage, curves 440 and 450, from the total magnitude of the red channel 430. Curves 440 and 450 can be estimated as a percentage of curves 410 and 420, respectively. In contrast with a three-sensor array device, this precision spectral analysis can be accomplished with a single sensor array through this use of multiple band filtering. This reduces size, weight, cost, and complexity of the system. Additional spectral bands may be determined in a similar manner, such as bands shown in FIG. 5.

Figure 5:
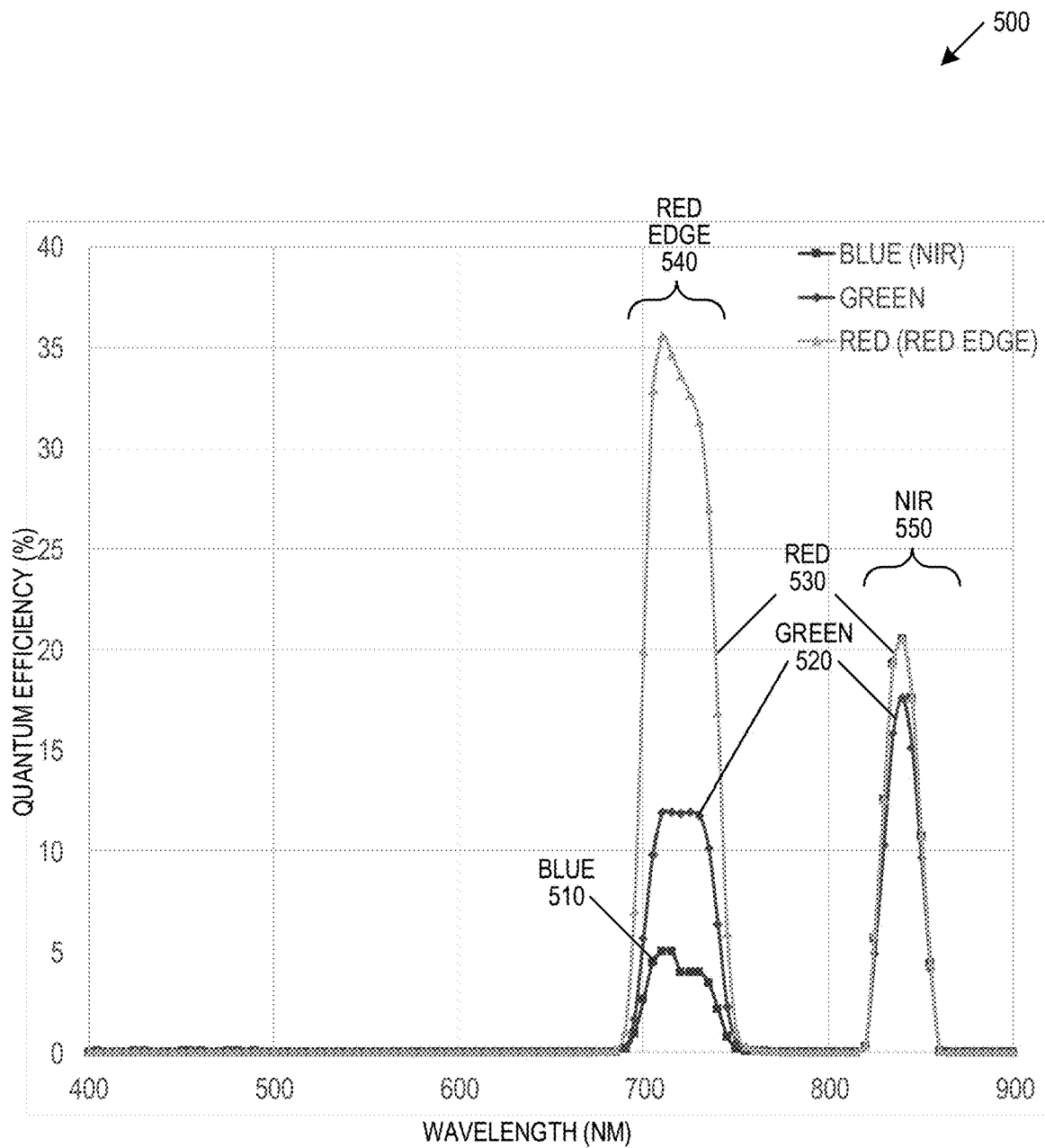
FIG. 5 is a graph of a fourth response curve, in accordance with at least one embodiment.

FIG. 5 is a graph of a fourth response curve 500, in accordance with at least one embodiment. For example, the second optical filter 225 may pass a narrow band of red edge wavelengths 540 and a narrow band of NIR wavelengths 550. As shown in FIG. 4, the spectral bands include a small portion of spectral leakage from blue 510, green, 520, and red 530. This multiband second optical filter 225 may be combined with a multiband first optical filter 215 to provide additional spectral information, such as shown in FIG. 6.

Figure 6:
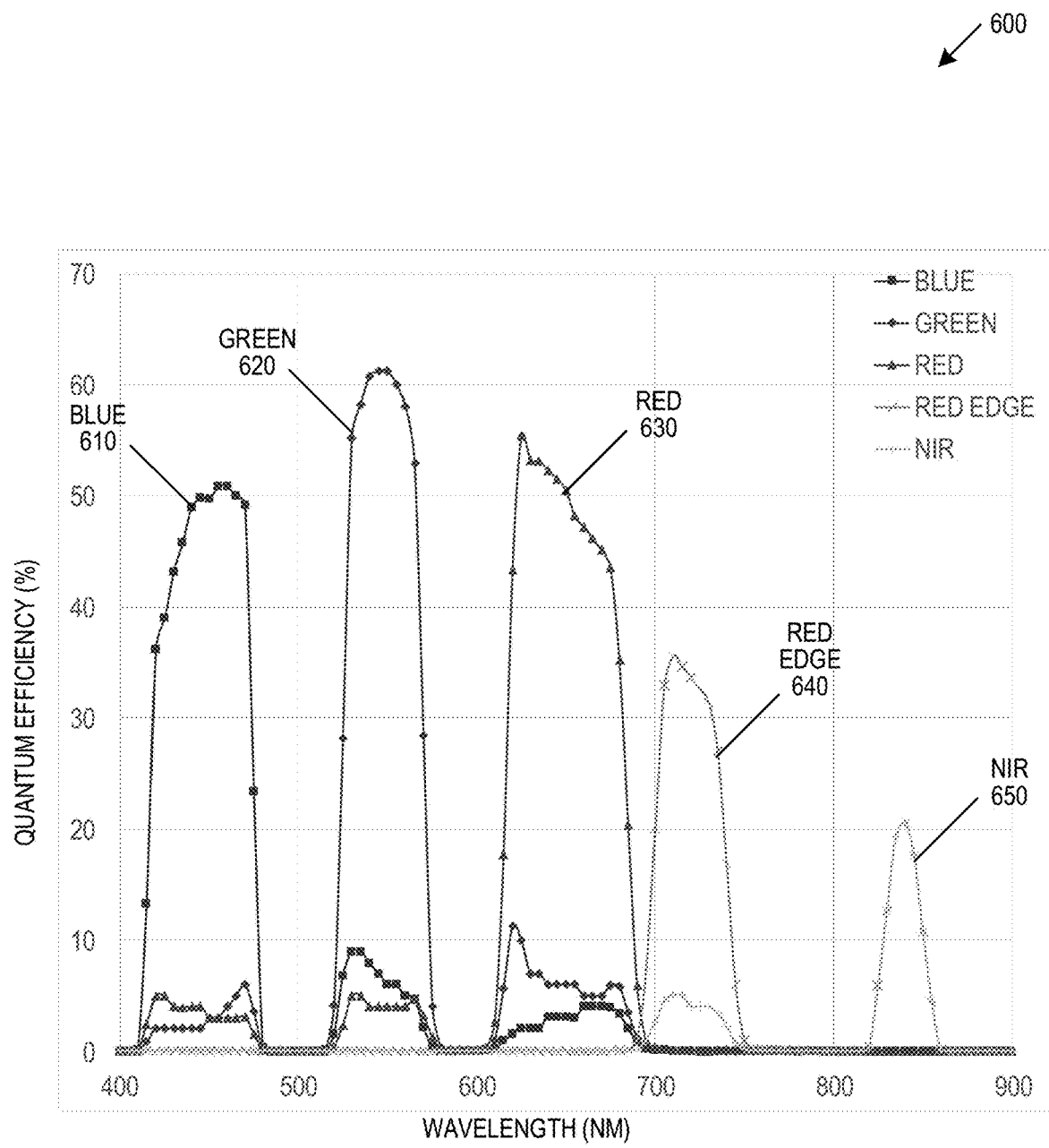
FIG. 6 is a graph of a fifth response curve, in accordance with at least one embodiment.

FIG. 6 is a graph of a fifth response curve 600, in accordance with at least one embodiment. Response curve 600 shows five different spectral regions corresponding to a narrow band of blue light 610, a narrow band of green light 620, a narrow band of red light 630, a narrow band of red edge 640, and a narrow band of NIR 650. As shown in FIG. 6, some spectral leakage is present in each of the five regions. For example, the narrow band of green light 620 includes a small amount of spectral leakage coining from the blue and red regions as well. As discussed above, the spectral leakage can subtracted out from each narrow spectral band based on the area within the spectral band and the area within the other spectral bands.

Figure 7:
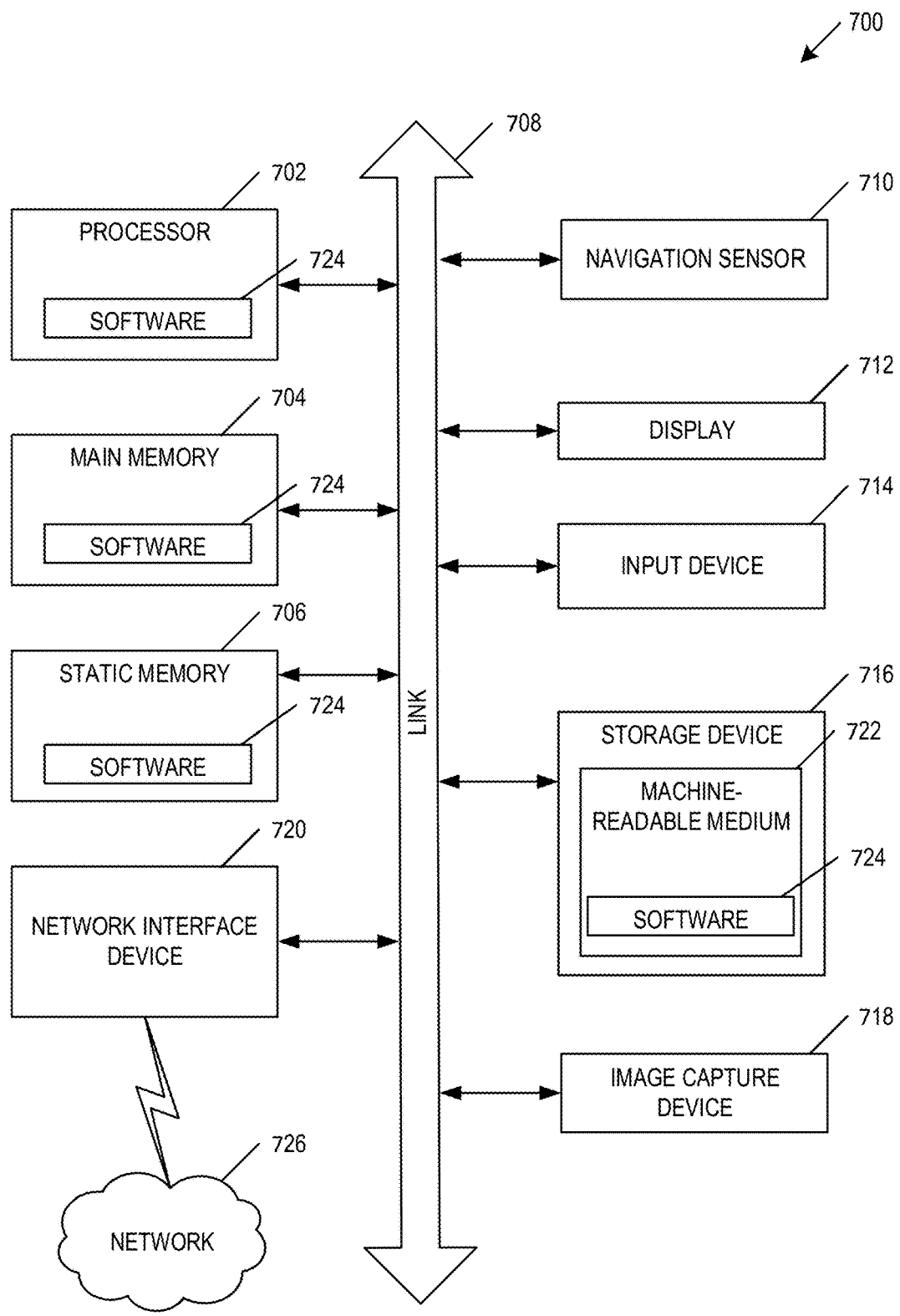
FIG. 7 is a block diagram illustrating a multiband image analysis system in an example form of an electronic device, according to an example embodiment.

FIG. 7 is a block diagram illustrating a multiband image analysis system in an example form of an electronic device 700, within which a set or sequence of instructions may be executed to cause the machine to perform any one of the methodologies discussed herein, according to an example embodiment. Electronic device 700 may represent an index survey vehicle, or may represent an electronic device on which the index analysis occurs. In alternative embodiments, the electronic device 700 operates as a standalone device or may be connected (e.g., networked) to other machines. In a networked deployment, the electronic device 700 may operate in the capacity of either a server or a client machine in server-client network environments, or it may act as a peer machine in peer-to-peer (or distributed) network environments. The electronic device 700 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 700 capable of executing instructions (sequential or otherwise) that specify actions to be taken by that machine to detect a user input. Further, while only a single electronic device 700 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 700 includes at least one processor 702 (e.g., a central processing unit (CPU), a graphics processing unit (GPU) or both, processor cores, compute nodes, etc.), a main memory 704 and a static memory 706, which communicate with each other via, a link 708 (e.g., bus). The main memory 704 or static memory 706 may be used to store navigation data (e.g., predetermined waypoints) or payload data (e.g., stored captured images).

The electronic device 700 includes a navigation sensor 710, which may provide a geographic reference (i.e., georeference) for captured imagery. Navigation sensor 710 may include an IMU, which may include an accelerometer and gyroscope to output vehicle roll, pitch, yaw, acceleration, or other inertial data. The navigation sensor 710 may include a compass to provide heading, or may include a GNSS to provide location. The navigation sensor 710 may include a tightly coupled IMU and GNSS system.

The electronic device 700 may further include a display unit 712, where the display unit 712 may include a single component that provides a user-readable display and a protective layer, or another display type. The electronic device 700 may further include an input device 714, such as a pushbutton, a keyboard, or a user interface (UI) navigation device (e.g., a mouse or touch-sensitive input). The electronic device 700 may additionally include a storage device 716, such as a drive unit. The electronic device 700 may additionally include an image capture device 718 to provide to capture one or more images for processing as described above. The electronic device 700 may additionally include a network interface device 720, and one or more additional sensors (not shown).

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, or within the processor 702 during execution thereof by the electronic device 700. The main memory 704, static memory 706, and the processor 702 may also constitute machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g. electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a system for capturing an aerial image and generating a multispectral vegetative index, the system comprising: a first multiband image sensor attached to an aerial vehicle to capture a first multispectral filtered image of a vegetation area; a first multiband optical filter attached to the first multiband image sensor to filter an image of a vegetation area and provide the first multispectral filtered image of a vegetation area to the first multiband image sensor; and a processor to: generate a first image data set based on the captured first multispectral filtered image; and generate a multispectral vegetative index based on the first image data set.

In Example 2, the subject matter of Example 1 optionally includes wherein the multispectral vegetative index is generated using the first sensor without requiring an additional image sensor.

In Example 3, the subject matter of Example 2 optionally includes wherein: the first sensor includes a 3-channel sensor most sensitive to light within a red frequency band, a green frequency band, and a blue frequency band; and the generation of the first image data set includes generating an estimated NIR frequency portion based on a red light frequency portion of the first image data set and a blue light frequency portion of the first image data set.

In Example 4, the subject matter of Example 3 optionally includes wherein: the first plurality of light wavelength passbands within the first multiband optical filter includes a near-infrared (NIR) passband and red passband; and the generation of the multispectral vegetative index is based on the estimated NIR frequency portion of the first image data set and a red light frequency portion of the first image data set.

In Example 5, the subject matter of any one or more of Examples 3-4 optionally include wherein: the first plurality of light wavelength passbands within the first multiband optical filter includes a NIR passband and green passband; and the generation of the multispectral vegetative index is based on the estimated NIR frequency portion of the first image data set and a green light frequency portion of the first image data set.

In Example 6, the subject matter of any one or more of Examples 3-5 optionally include wherein: the first plurality of light wavelength passbands within the first multiband optical filter includes a NIR passband and red edge passband; and the generation of the multispectral vegetative index is based on the estimated NIR frequency portion of the first image data set and a red edge light frequency portion of the first image data set.

In Example 7, the subject matter of any one or more of Examples 3-6 optionally include wherein: the first plurality of light wavelength passbands within the first multiband optical filter includes a NIR passband, a green passband, and a red passband; and the generation of the multispectral vegetative index is based on the estimated NIR frequency portion of the first image data set, a green light frequency portion of the first image data set, and a red light frequency portion of the first image data set.

In Example 8, the subject matter of any one or more of Examples 3-7 optionally include wherein: the first plurality of light wavelength passbands within the first multiband optical filter includes a NIR passband, a green passband, and a red edge passband; and the generation of the multispectral vegetative index is based on the estimated NIR frequency portion of the first image data set, a green light frequency portion of the first image data set, and a red edge light frequency portion of the first image data set.

In Example 9, the subject matter of any one or more of Examples 2-8 optionally include wherein: the first sensor includes a 4-channel sensor most sensitive to light within a red frequency band, a green frequency band, a blue frequency band, and a NIR frequency band; the first plurality of light wavelength passbands within the first multiband optical filter includes a red passband, a green passband, a blue passband, and a NIR passband; and the generation of the multispectral vegetative index is based on a red light frequency portion of the first image data set, a green light frequency portion of the first image data set, a blue light frequency portion of the first image data set, and an NIR light frequency portion of the first image data set.

In Example 10, the subject matter of any one or more of Examples 2-9 optionally include wherein: the first sensor includes a 4-channel sensor most sensitive to light within a red frequency band, a green frequency band, a red edge frequency band, and a NIR frequency band; the first plurality of light wavelength passbands within the first multiband optical filter includes a red passband, a green passband, a red edge passband, and a NIR passband; and the generation of the multispectral vegetative index is based on a red light frequency portion of the first image data set, a green light frequency portion of the first image data set, a red edge light frequency portion of the first image data set, and an NIR light frequency portion of the first image data set.

In Example 11, the subject matter of any one or more of Examples 1-10 optionally include the system further including: a second multiband image sensor attached to the aerial vehicle to capture a second multispectral filtered image of the vegetation area; and a second multiband optical filter attached to the second multiband image sensor to filter the image of the vegetation area and provide the second multispectral filtered image of the vegetation area to the second multiband image sensor; the processor further to generate a second image data set at the second image sensor based on the captured second multispectral filtered image; wherein the generation of the multispectral vegetative index is further based on the second image data set.

In Example 12, the subject matter of Example 11 optionally includes wherein the multispectral vegetative index is generated using the first sensor and the second sensor without requiring an additional image sensor.

In Example 13, the subject matter of Example 12 optionally includes wherein: the first sensor includes a first 3-channel RGB sensor most sensitive to light within a red frequency band, a green frequency band, and a blue frequency band; the first plurality of light wavelength passbands within the first multiband optical filter includes a red passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red edge passband and an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 14, the subject matter of any one or more of Examples 12-13 optionally include wherein: the first sensor includes a first 3-channel RGB sensor most sensitive to light within a red frequency band, a green frequency band, and a blue frequency band; the first plurality of light wavelength passbands within the first multiband optical filter includes a red edge passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red passband and an NIR passband; and the generation of the multispectral vegetative index is based on a red light frequency portion of the second image data set, a green light frequency portion of the first image data set, a blue light frequency portion of the first image data set, and an NIR light frequency portion of the second image data set.

In Example 15, the subject matter of any one or more of Examples 12-14 optionally include wherein: the first sensor includes a first 3-channel RGB sensor most sensitive to light within a red frequency band, a green frequency band, and a blue frequency band; the first plurality of light wavelength passbands within the first multiband optical filter includes a red passband, a green passband, and a blue passband; the second sensor includes a 1-channel RGB sensor most sensitive to light within an NIR frequency band; the second plurality of light wavelength passbands within the second multiband optical filter includes a an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 16, the subject matter of any one or more of Examples 1-15 optionally include wherein the generation of the multispectral vegetative index includes generating a Normalized Difference Vegetation Index (NDVI) based on a red frequency portion and an NIR frequency portion as NDVI=(NIR frequency portion−red frequency portion)/(NIR frequency portion+red frequency portion).

In Example 17, the subject matter of any one or more of Examples 1-16 optionally include wherein the generation of the multispectral vegetative index includes generating a Green Normalized Difference Vegetation Index (GNDVI) based on a green frequency portion and an NIR frequency portion as NDVI=(NIR frequency portion−green frequency portion)/(NIR frequency portion+green frequency portion).

In Example 18, the subject matter of any one or more of Examples 1-17 optionally include wherein the vegetative index includes at least one of a Leaf Area Index, an Optimized Soil-Adjusted Vegetation Index, Linear Red Edge Index; and a Transformed Chlorophyll Absorption Reflectance Index.

Example 19 is a method of capturing an aerial image and generating a multispectral vegetative index, the method comprising: capturing a first multispectral filtered image of a vegetation area, the first multispectral filtered image filtered by a first multiband optical filter and captured by a first multiband image sensor attached to an aerial vehicle, the first multiband optical filter including a first plurality of light wavelength passbands; generating a first image data set at the first image sensor based on the captured first multispectral filtered image; and generating a multispectral vegetative index based on the first image data set.

In Example 20, the subject matter of Example 19 optionally includes wherein the multispectral vegetative index is generated using the first sensor without requiring an additional image sensor.

In Example 21, the subject matter of Example 20 optionally includes wherein: the first sensor includes a 3-channel sensor most sensitive to light within a red frequency band, a green frequency band, and a blue frequency band; and the generation of the first image data set includes generating an estimated NIR frequency portion based on a red light frequency portion of the first image data set and a blue light frequency portion of the first image data set.

In Example 22, the subject matter of Example 21 optionally includes wherein: the first plurality of light wavelength passbands within the first multiband optical filter includes a near-infrared (NIR) passband and red passband; and the generation of the multispectral vegetative index is based on the estimated NIR frequency portion of the first image data set and a red light frequency portion of the first image data set.

In Example 23, the subject matter of any one or more of Examples 21-22 optionally include wherein: the first plurality of light wavelength passbands within the first multiband optical filter includes a NIR passband and green passband; and the generation of the multispectral vegetative index is based on the estimated NIR frequency portion of the first image data set and a green light frequency portion of the first image data set.

In Example 24, the subject matter of any one or more of Examples 21-23 optionally include wherein: the first plurality of light wavelength passbands within the first multiband optical filter includes a NIR passband and red edge passband; and the generation of the multispectral vegetative index is based on the estimated NIR frequency portion of the first image data set and a red edge light frequency portion of the first image data set.

In Example 25, the subject matter of any one or more of Examples 21-24 optionally include wherein: the first plurality of light wavelength passbands within the first multiband optical filter includes a NIR passband, a green passband, and a red passband; and the generation of the multispectral vegetative index is based on the estimated NIR frequency portion of the first image data set, a green light frequency portion of the first image data set, and a red light frequency portion of the first image data set.

In Example 26, the subject matter of any one or more of Examples 21-25 optionally include wherein: the first plurality of light wavelength passbands within the first multiband optical filter includes a NIR passband, a green passband, and a red edge passband; and the generation of the multi spectral vegetative index is based on the estimated NIR frequency portion of the first image data set, a green light frequency portion of the first image data set, and a red edge light frequency portion of the first image data set.

In Example 27, the subject matter of any one or more of Examples 20-26 optionally include wherein: the first sensor includes a 4-channel sensor most sensitive to light within a red frequency band, a green frequency band, a blue frequency band, and a NIR frequency band; the first plurality of light wavelength passbands within the first multiband optical filter includes a red passband, a green passband, a blue passband, and a NIR passband; and the generation of the multispectral vegetative index is based on a red light frequency portion of the first image data set, a green light frequency portion of the first image data set, a blue light frequency portion of the first image data set, and an NIR light frequency portion of the first image data set.

In Example 28, the subject matter of any one or more of Examples 20-27 optionally include wherein: the first sensor includes a 4-channel sensor most sensitive to light within a red frequency band, a green frequency band, a red edge frequency band, and a NIR frequency band; the first plurality of light wavelength passbands within the first multiband optical filter includes a red passband, a green passband, a red edge passband, and a NIR passband; and the generation of the multispectral vegetative index is based on a red light frequency portion of the first image data set, a green light frequency portion of the first image data set, a red edge light frequency portion of the first image data set, and an NIR light frequency portion of the first image data set.

In Example 29, the subject matter of any one or more of Examples 19-28 optionally include the method further including: capturing a second multispectral filtered image of a vegetation area, the multispectral filtered image filtered by a second multiband optical filter and captured by a second multiband image sensor attached to the aerial vehicle, the second multiband optical filter including a second plurality of light wavelength passbands; and generating a second image data set at the second image sensor based on the captured second multispectral filtered image; wherein the generation of the multispectral vegetative index is further based on the second image data set.

In Example 30, the subject matter of Example 29 optionally, includes wherein the multispectral vegetative index is generated using the first sensor and the second sensor without requiring an additional image sensor.

In Example 31, the subject matter of Example 30 optionally includes wherein: the first sensor includes a first 3-channel RGB sensor most sensitive to light within a red frequency band, a green frequency band, and a blue frequency band; the first plurality of light wavelength passbands within the first multiband optical filter includes a red passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red edge passband and an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 32, the subject matter of any one or more of Examples 30-31 optionally include wherein: the first sensor includes a first 3-channel RGB sensor most sensitive to light within a red frequency band, a green frequency band, and a blue frequency band; the first plurality of light wavelength passbands within the first multiband optical filter includes a red edge passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red passband and an NIR passband; and the generation of the multispectral vegetative index is based on a red light frequency portion of the second image data set, a green light frequency portion of the first image data set, a blue light frequency portion of the first image data set, and an NIR light frequency portion of the second image data set.

In Example 33, the subject matter of any one or more of Examples 30-32 optionally include wherein: the first sensor includes a first 3-channel RGB sensor most sensitive to light within a red frequency band, a green frequency band, and a blue frequency band; the first plurality of light wavelength passbands within the first multiband optical filter includes a red passband, a green passband, and a blue passband; the second sensor includes a 1-channel RGB sensor most sensitive to light within an NIR frequency band; the second plurality of light wavelength passbands within the second multiband optical filter includes a an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 34, the subject matter of any one or more of Examples 19-33 optionally include wherein the generation of the multispectral vegetative index includes generating a Normalized Difference Vegetation Index (NDVI) based on a red frequency portion and an NIR frequency portion as NDVI=(NIR frequency portion−red frequency portion)/(NIR frequency portion+red frequency portion).

In Example 35, the subject matter of any one or more of Examples 19-34 optionally include wherein the generation of the multispectral vegetative index includes generating a Green Normalized Difference Vegetation Index (GNDVI) based on a green frequency portion and an NIR frequency portion as NDVI=(NIR frequency portion−green frequency portion)/(NIR frequency portion+green frequency portion).

In Example 36, the subject matter of any one or more of Examples 19-35 optionally include wherein the vegetative index includes at least one of a Leaf Area Index, an Optimized Soil-Adjusted Vegetation Index, Linear Red Edge Index, and a Transformed Chlorophyll Absorption Reflectance Index.

Example 37 is at least one non-transitory machine-readable storage medium, comprising a plurality of instructions that, responsive to being executed with processor circuitry of a computer-controlled device, cause the computer-controlled device to: capture a first multispectral filtered image of a vegetation area, the first multispectral filtered image filtered by a first multiband optical filter and captured by a first multi band image sensor attached to an aerial vehicle, the first multiband optical filter including a first plurality of light wavelength passbands; generate a first image data set at the first image sensor based on the captured first multispectral filtered image; and generate a multispectral vegetative index based on the first image data set.

In Example 38, the subject matter of Example 37 optionally includes wherein the multispectral vegetative index is generated using the first sensor without requiring an additional image sensor.

In Example 39, the subject matter of Example 38 optionally includes wherein: the first sensor includes a 3-channel sensor most sensitive to light within a red frequency band, a green frequency band, and a blue frequency band; and the generation of the first image data set includes generating an estimated NIR frequency portion based on a red light frequency portion of the first image data set and a blue light frequency portion of the first image data set.

In Example 40, the subject matter of Example 39 optionally includes wherein: the first plurality of light wavelength passbands within the first multiband optical filter includes a near-infrared (NIR) passband and red passband; and the generation of the multispectral vegetative index is based on the estimated NIR frequency portion of the first image data set and a red light frequency portion of the first image data set.

In Example 41, the subject matter of any one or more of Examples 39-40 optionally include wherein: the first plurality of light wavelength passbands within the first multiband optical filter includes a NIR passband and green passband; and the generation of the multispectral vegetative index is based on the estimated NIR frequency portion of the first image data set and a green light frequency portion of the first image data set.

In Example 42, the subject matter of any one or more of Examples 39-41 optionally include wherein: the first plurality of light wavelength passbands within the first multiband optical filter includes a NIR passband and red edge passband; and the generation of the multispectral vegetative index is based on the estimated NIR frequency portion of the first image data set and a red edge light frequency portion of the first image data set.

In Example 43, the subject matter of any one or more of Examples 39-42 optionally include wherein: the first plurality of light wavelength passbands within the first multiband optical filter includes a NIR passband, a green passband, and a red passband; and the generation of the multispectral vegetative index is based on the estimated NIR frequency portion of the first image data set, a green light frequency portion of the first image data set, and a red light frequency portion of the first image data set.

In Example 44, the subject matter of any one or more of Examples 39-43 optionally include wherein: the first plurality of light wavelength passbands within the first multiband optical filter includes a NIR passband, a green passband, and a red edge passband; and the generation of the multispectral vegetative index is based on the estimated NIR frequency portion of the first image data set, a green light frequency portion of the first image data set, and a red edge light frequency portion of the first image data set.

In Example 45, the subject matter of any one or more of Examples 38-44 optionally include wherein: the first sensor includes a 4-channel sensor most sensitive to light within a red frequency band, a green frequency band, a blue frequency band, and a NIR frequency band; the first plurality of light wavelength passbands within the first multiband optical filter includes a red passband, a green passband, a blue passband, and a NIR passband; and the generation of the multispectral vegetative index is based on a red light frequency portion of the first image data set, a green light frequency portion of the first image data set, a blue light frequency portion of the first image data set, and an NIR light frequency portion of the first image data set.

In Example 46, the subject matter of any one or more of Examples 38-45 optionally include wherein: the first sensor includes a 4-channel sensor most sensitive to light within a red frequency band, a green frequency band, a red edge frequency band, and a NIR frequency band; the first plurality of light wavelength passbands within the first multiband optical filter includes a red passband, a green passband, a red edge passband, and a NIR passband; and the generation of the multispectral vegetative index is based on a red light frequency portion of the first image data set, a green light frequency portion of the first image data set, a red edge light frequency portion of the first image data set, and an NIR light frequency portion of the first image data set.

In Example 47, the subject matter of any one or more of Examples 37-46 optionally include the instructions further causing the computer-controlled device to: capture a second multispectral filtered image of a vegetation area, the multispectral filtered image filtered by a second multiband optical filter and captured by a second multiband image sensor attached to the aerial vehicle, the second multiband optical filter including a second plurality of light wavelength passbands; and generate a second image data set at the second image sensor based on the captured second multispectral filtered image; wherein the generation of the multispectral vegetative index is further based on the second image data set.

In Example 48, the subject matter of Example 47 optionally includes wherein the multispectral vegetative index is generated using the first sensor and the second sensor without requiring an additional image sensor.

In Example 49, the subject matter of Example 48 optionally includes wherein: the first sensor includes a first 3-channel RGB sensor most sensitive to light within a red frequency band; a green frequency band; and a blue frequency band; the first plurality of light wavelength passbands within the first multiband optical filter includes a red passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red edge passband and an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 50, the subject matter of any one or more of Examples 48-49 optionally include wherein: the first sensor includes a first 3-channel RGB sensor most sensitive to light within a red frequency band, a green frequency band, and a blue frequency band; the first plurality of light wavelength passbands within the first multiband optical filter includes a red edge passband, a green passband, and a blue passband; the second sensor includes a second 3-channel RGB sensor most sensitive to light within the red frequency band, the green frequency band, and the blue frequency band; the second plurality of light wavelength passbands within the second multiband optical filter includes a red passband and an NIR passband; and the generation of the multispectral vegetative index is based on a red light frequency portion of the second image data set, a green light frequency portion of the first image data set, a blue light frequency portion of the first image data set, and an NIR light frequency portion of the second image data set.

In Example 51, the subject matter of any one or more of Examples 48-50 optionally include wherein: the first sensor includes a first 3-channel RGB sensor most sensitive to light within a red frequency band, a green frequency band, and a blue frequency band; the first plurality of light wavelength passbands within the first multiband optical filter includes a red passband, a green passband, and a blue passband; the second sensor includes a 1-channel RGB sensor most sensitive to light within an NIR frequency band; the second plurality of light wavelength passbands within the second multiband optical filter includes a an NIR passband; and the generation of the multispectral vegetative index is based on a red light frequency portion of the first image data set, a green light frequency portion of the first image data set, a blue light frequency portion of the first image data set, and an NIR light frequency portion of the second image data set.

In Example 52, the subject matter of any one or more of Examples 37-51 optionally include wherein the generation of the multispectral vegetative index includes generating a Normalized Difference Vegetation Index (NDVI) based on a red frequency portion and an NIR frequency portion as NDVI=(NIR frequency portion−red frequency portion)/(NIR frequency portion+red frequency portion).

In Example 53, the subject matter of any one or more of Examples 37-52 optionally include wherein the generation of the multispectral vegetative index includes generating a Green Normalized Difference Vegetation Index (GNDVI) based on a green frequency portion and an NIR frequency portion as NDVI=(NIR frequency portion−green frequency portion)/(NIR frequency portion+green frequency portion).

In Example 54, the subject matter of any one or more of Examples 37-53 optionally include wherein the vegetative index includes at least one of a Leaf Area Index, an Optimized Soil-Adjusted Vegetation Index, Linear Red Edge Index, and a Transformed Chlorophyll Absorption Reflectance Index.

Example 55 is a multiband filtering imaging method comprising: passing a first filtered image through a first multiband optical filter to a first image sensor, the first filter including a first plurality of light wavelength passbands; generating a first image data set at the first image sensor based on the passed first filtered image; passing a second filtered image through a second multiband optical filter to a second image sensor, the second filter including a second plurality of light wavelength passbands; generating a second image data set at the second image sensor based on the passed second filtered image; and generating a combined multispectral image based on the first image data set and the second image data set.

In Example 56, the subject matter of Example 55 optionally includes wherein the first plurality of light wavelength passbands within the first multiband optical filter passes light within a blue passband, a green passband, and a red passband.

In Example 57, the subject matter of Example 56 optionally includes wherein the second plurality of light wavelength passbands within the second multiband optical filter passes light within a red edge passband and a near-infrared (NW) passband.

In Example 58, the subject matter of Example 57 optionally includes—channel image sensor.

In Example 59, the subject matter of Example 58 optionally includes—channel image sensor is most sensitive to light within a blue frequency band, a green frequency band, and a red frequency band.

In Example 60, the subject matter of Example 59 optionally includes wherein the first image data set includes a first blue data set, a first green data set, and a first red data set, the method further including: generating a blue channel based on a difference between a first portion of the first blue data set within the blue passband and a second portion of the first blue data set outside the blue passband; generating a green channel based on a difference between a first portion of the first green data set within the green passband and a second portion of the first green data set outside the green passband; and generating a red channel based on a difference between a first portion of the first red data set within the red passband and a second portion of the first red data set outside the red passband; wherein the generation of the combined multispectral image is based on the generated blue channel, the generated green channel, and the generated red channel.

In Example 61, the subject matter of Example 60 optionally includes wherein the second image data set includes a second red data set, a second green data set, and a second blue data set, the method further including: generating a red edge channel based on a difference between a second portion of the second blue data set within the red edge passband and a second portion of the second red data set within the red edge passband; and generating a NIR channel based on a difference between a first portion of the first green data set within the green passband and a second portion of the first green data set outside the green passband; wherein the generation of the combined multispectral image is based on the generated red edge channel and the generated NIR channel.

In Example 62, the subject matter of Example 61 optionally includes wherein the generation of the combined multispectral image includes generating a Normalized Difference Vegetation Index (NDVI) image.

Example 63 is a multiband filtering imaging system comprising: a first multiband optical filter, the first filter including a first plurality of light wavelength passbands; a first image sensor to receive light through the first filter and generate a first image data set; a second multiband optical filter, the second filter including a second plurality of light wavelength passbands, the second plurality of passbands being different from the first plurality of passbands; a second image sensor to receive light through the second filter and generate a second image data set; and a processor to: receive the first image data set and the second image data set; and generate a combined multispectral image based on the first image data set and the second image data set.

In Example 64, the subject matter of Example 63 optionally includes wherein the first plurality of light wavelength passbands within the first multiband optical filter passes light within a blue passband, a green passband, and a red passband.

In Example 65, the subject matter of Example 64 optionally includes wherein the second plurality of light wavelength passbands within the second multiband optical filter passes light within a red edge passband and a near-infrared (NIR) passband.

In Example 66, the subject matter of Example 65 optionally includes—channel image sensor.

In Example 67, the subject matter of Example 66 optionally includes—channel image sensor is most sensitive to light within a blue frequency band; a green frequency band; and a red frequency band.

In Example 68, the subject matter of Example 67 optionally includes wherein the first image data, set includes a first blue data set, a first green data set, and a first red data set; and the processor is further to: generate a blue channel based on a difference between a first portion of the first blue data set within the blue passband and a second portion of the first blue data set outside the blue passband; generate a green channel based on a difference between a first portion of the first green data set within the green passband and a second portion of the first green data set outside the green passband; and generate a red channel based on a difference between a first portion of the first red data set within the red passband and a second portion of the first red data set outside the red passband; wherein the generation of the combined multispectral image is based on the generated blue channel, the generated green channel, and the generated red channel.

In Example 69, the subject matter of Example 68 optionally includes wherein the second image data set includes a second red data set, a second green data set, and a second blue data set; and the processor is further to: generate a red edge channel based on a difference between a second portion of the second blue data set within the red edge passband and a second portion of the second red data set within the red edge passband; and generate a NIR channel based on a difference between a first portion of the first green data set within the green passband and a second portion of the first green data set outside the green passband; wherein the generation of the combined multispectral image is based on the generated red edge channel and the generated NIR channel.

In Example 70, the subject matter of Example 69 optionally includes wherein the generation of the combined multispectral image includes the processor generating a Normalized Difference Vegetation index (NDVI) image.

Example 71 is at least one machine-readable medium including instructions, which when executed by a machine, cause the machine to perform operations of any of the operations of Examples 1-70.

Example 72 is an apparatus comprising means for performing any of the operations of Examples 1-70.

Example 73 is a system to perform the operations of any of the Examples 1-70.

Example 74 is a method to perform the operations of any of the Examples 1-70.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "Third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An aerial multispectral imagery system comprising: a first multichannel image sensor attached to an aerial vehicle to capture a first multispectral filtered image of a vegetation area;
a first multiband optical filter attached to the first multichannel image sensor to filter an image of the vegetation area and provide the first multispectral filtered image of the vegetation area to the first multichannel image sensor; and
a processor to; generate a first image data set based on the captured first multispectral filtered image, the first image data set including data for a first spectral response curve of a first channel having a first spectral region of interest and data for a second spectral response curve of a second channel having a second spectral region of interest;
determine, using the first image data set, a first spectral content in the first spectral region of interest by subtracting from a first channel spectral response a percentage of a second channel spectral response within the second spectral region of interest, where the percentage is a ratio of the first channel spectral response and the second channel spectral response within the second spectral region of interest; and
determine, using the first image data set, a second spectral content in the second spectral region of interest by subtracting from the second channel spectral response a percentage of the first channel spectral response within the first spectral region of interest, where the percentage is a ratio of the second channel spectral response and the first channel spectral response within the first spectral region of interest.

2. The system of claim 1, wherein:
the first image data set includes data for a third spectral response curve of a third channel having a third spectral region of interest; and
the processor determines, using the first image data set, a first spectral content in the first spectral region of interest by subtracting from the first channel spectral response a first percentage of the second channel spectral response within the second spectral region of interest and a second percentage of a third channel spectral response within the third spectral region of interest, where the first percentage is a ratio of the first channel spectral response and the second channel spectral response within the second spectral region of interest, and the second percentage is a ratio of the first channel spectral response and the third channel spectral response within the third spectral region of interest.

3. The system of claim 2, wherein:
the first spectral region of interest is a red spectral region, the second spectral region of interest is a blue spectral region, and the third spectral region of interest is a green spectral region.

4. The system of claim 1, wherein:
the first spectral region of interest is a red spectral region and the second spectral region of interest is a near infrared spectral region; or
the first spectral region of interest is a red edge spectral region and the second spectral region of interest is a near infrared spectral region.

5. The system of claim 1, wherein:
the first multichannel image sensor is a 4 channel image sensor, and the first image data set includes data for a third spectral response curve of a third channel having a third spectral region of interest and data for a fourth spectral response curve of a fourth channel having a fourth spectral region of interest.

6. The system of claim 5, wherein:
the first spectral region of interest, the second spectral region of interest, the third spectral region of interest, and the fourth spectral region of interest are any four of a red spectral region, a red edge spectral region, a near infrared spectral region, a blue spectral region, and a green spectral region.

7. The system of claim 1, wherein the processor uses the first spectral content and the second spectral content to determine a vegetation index.

8. A method of aerial multi spectral imagery, comprising:
capturing a first multispectral filtered image of a vegetation area, the first multispectral filtered image filtered by a first multiband optical filter and captured by a first multichannel image sensor attached to an aerial vehicle;
generating a first image data set based on the captured first multispectral filtered image, the first image data set including data for a first spectral response curve of a first channel hang a first spectra region of interest and data for a second spectral response curve of a second channel having a second spectral region of interest;
determining, using the first image data set, a first spectral content in the first spectral region of interest by subtracting from a first channel spectral response a percentage of a second channel spectral response within the second spectral region of interest, where the percentage is a ratio of the first channel spectral response and the second channel spectral response within the second spectral region of interest; and
determining, using the first image data set, a second spectral content in the second spectral region of interest by subtracting from the second channel spectral response a percentage of the first channel spectral response within the first spectral region of interest, where the percentage is a ratio of the second channel spectral response and the first channel spectral response within the first spectral region of interest.

9. The method of claim 8, wherein:
the first image data set includes data for a third spectral response curve of a third channel having a third spectral region of interest; and
further comprising determining, using the first image data set, a first spectral content in the first spectral region of interest by subtracting from the first channel spectral response a first percentage of the second channel spectral response within the second spectral region of interest and a second percentage of a third channel spectral response within the third spectral region of interest, where the first percentage is a ratio of the first channel spectral response and the second channel spectral response within the second spectral region of interest, and the second percentage is a ratio of the first channel spectral response and the third channel spectral response within the third spectral region of interest.

10. The method of claim 9, wherein:
the first spectral region of interest is a red spectral region, the second spectral region of interest is a blue spectral region, and the third spectral region of interest is a green spectral region.

11. The method of claim 8, wherein:
the first spectral region of interest is a red spectral region and the second spectral region of interest is a near infrared spectral region; or
the first spectral region of interest is a red edge spectral region and the second spectral region of interest is a near infrared spectral region.

12. The method of claim 8, wherein:
the first multichannel image sensor is a 4 channel image sensor, and the first image data set includes data for a third spectral response curve of a third channel having a third spectral region of interest and data for a fourth spectral response curve of a fourth channel having a fourth spectral region of interest.

13. The method of claim 12, wherein:
the first spectral region of interest, the second spectral region of interest, the third spectral region of interest, and the fourth spectral region of interest are any four of a red spectral region, a red edge spectral region, a near infrared spectral region, a blue spectral region, and a green spectral region.

14. The method of claim 8, comprising using the first spectral content and the second spectral content to determine a vegetation index.

15. At least one non-transitory machine-readable storage medium, comprising a plurality of instructions that, responsive to being executed with processor circuitry of a computer-controlled device, cause the computer-controlled device to:
capture a first multispectral filtered image of a vegetation area, the first multispectral filtered image filtered by a first multiband optical filter and captured by a first multichannel image sensor attached to an aerial vehicle;
generate a first image data set based on the captured first multispectral filtered image, the first image data set including data for a first spectral response curve of a first channel having a first spectral region of interest and data for a second spectral response curve of a second channel having a second spectral region of interest;
determine, using the first image data set, a first spectral content in the first spectral region of interest by subtracting from a first channel spectral response a percentage of a second channel spectral response within the second spectral region of interest, where the percentage is a ratio of the first channel spectral response and the second channel spectral response within the second spectral region of interest; and
determine, using the first image data set, a second spectral content in the second spectral region of interest by subtracting from the second channel spectral response a percentage of the first channel spectral response within the first spectral region of interest, where the percentage is a ratio of the second channel spectral response and the first channel spectral response within the first spectral region of interest.

16. The non-transitory machine-readable storage medium of claim 15, wherein:
the first image data set includes data for a third spectral response curve of a third channel having a third spectral region of interest; and
the instructions further causing the computer-controlled device to determine, using the first image data set, a first spectral content in the first spectral region of interest by subtracting from the first channel spectral response a first percentage of the second channel spectral response within the second spectral region of interest and a second percentage of a third channel spectral response within the third spectral region of interest, where the first percentage is a ratio of the first channel spectral response and the second channel spectral response within the second spectral region of interest, and the second percentage is a ratio of the first channel spectral response and the third channel spectral response within the third spectral region of interest.

17. The non-transitory machine-readable storage medium of claim 16, wherein:

the first spectral region of interest is a red spectral region, the second spectral region of interest is a blue spectral region, and the third spectral region of interest is a green spectral region.

18. The non-transitory machine-readable storage medium of claim 15, wherein:
the first spectral region of interest is a red spectral region and the second spectral region of interest is a near infrared spectral region; or
the first spectral region of interest is a red edge spectral region and the second spectral region of interest is a near infrared spectral region.

19. The non-transitory machine-readable storage medium of claim 15, wherein:
the first multichannel image sensor is a 4 channel image sensor, and the first image data set includes data for a third spectral response curve of a third channel having a third spectral region of interest and data for a fourth spectral response curve of a fourth channel having a fourth spectral region of interest.

20. The non-transitory machine-readable storage medium of claim 19, wherein:
the first spectral region of interest, the second spectral region of interest, the third spectral region of interest, and the fourth spectral region of interest are any four of a red spectral region, a red edge spectral region, a near infrared spectral region, a blue spectral region, and a green spectral region.

21. The non-transitory machine-readable storage medium of claim 15, wherein the instructions further causing the computer-controlled device to use the first spectral content and the second spectral content to determine a vegetation index.

* * * * *